July 25, 1944.    N. GRUBELIC    2,354,259
MACHINE FOR MEASURING AND PROPORTIONING PAINTS
Filed April 14, 1941    3 Sheets-Sheet 3
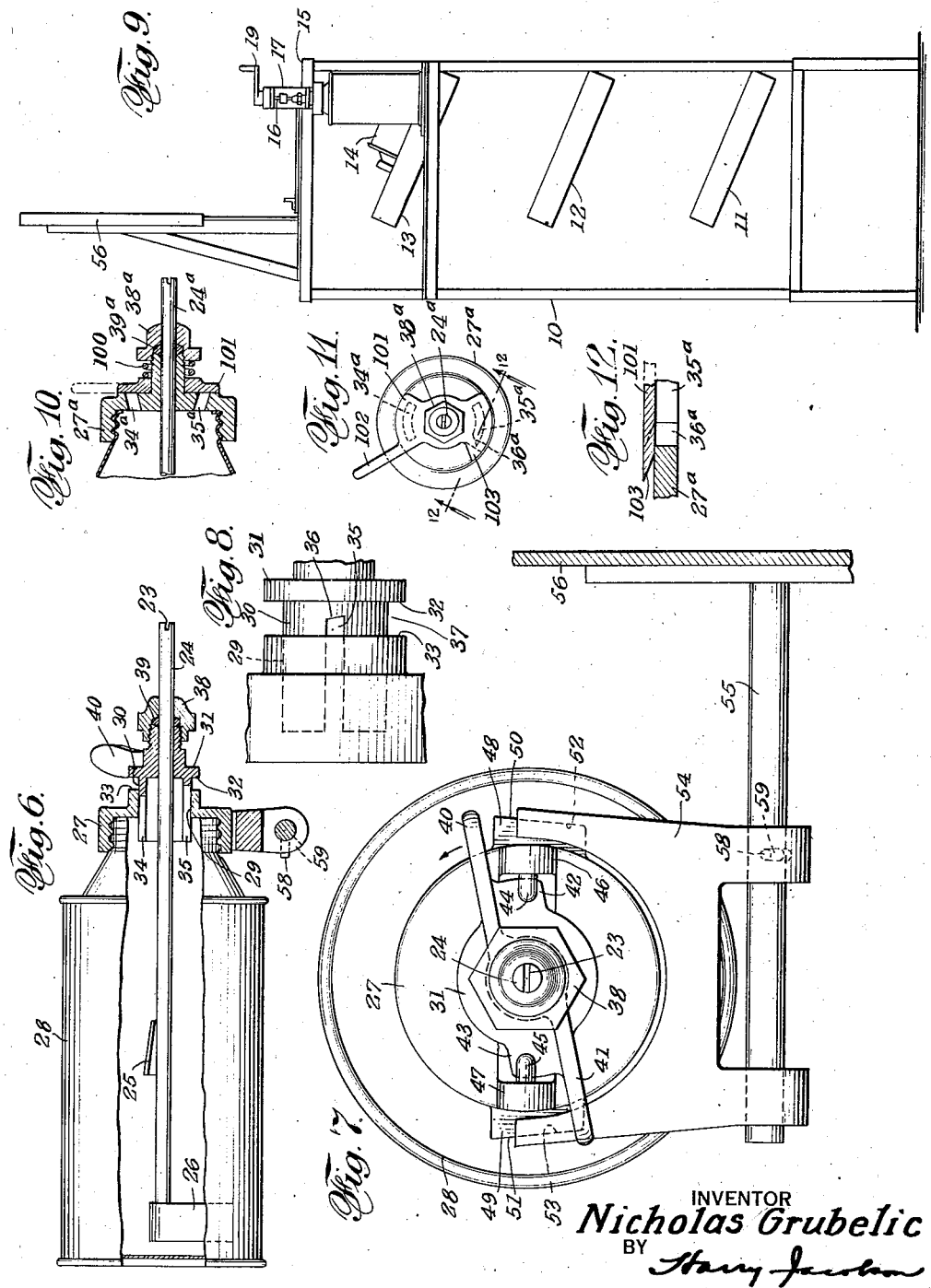
INVENTOR
Nicholas Grubelic
BY
Harry Jacobson
ATTORNEY Patented July 25, 1944

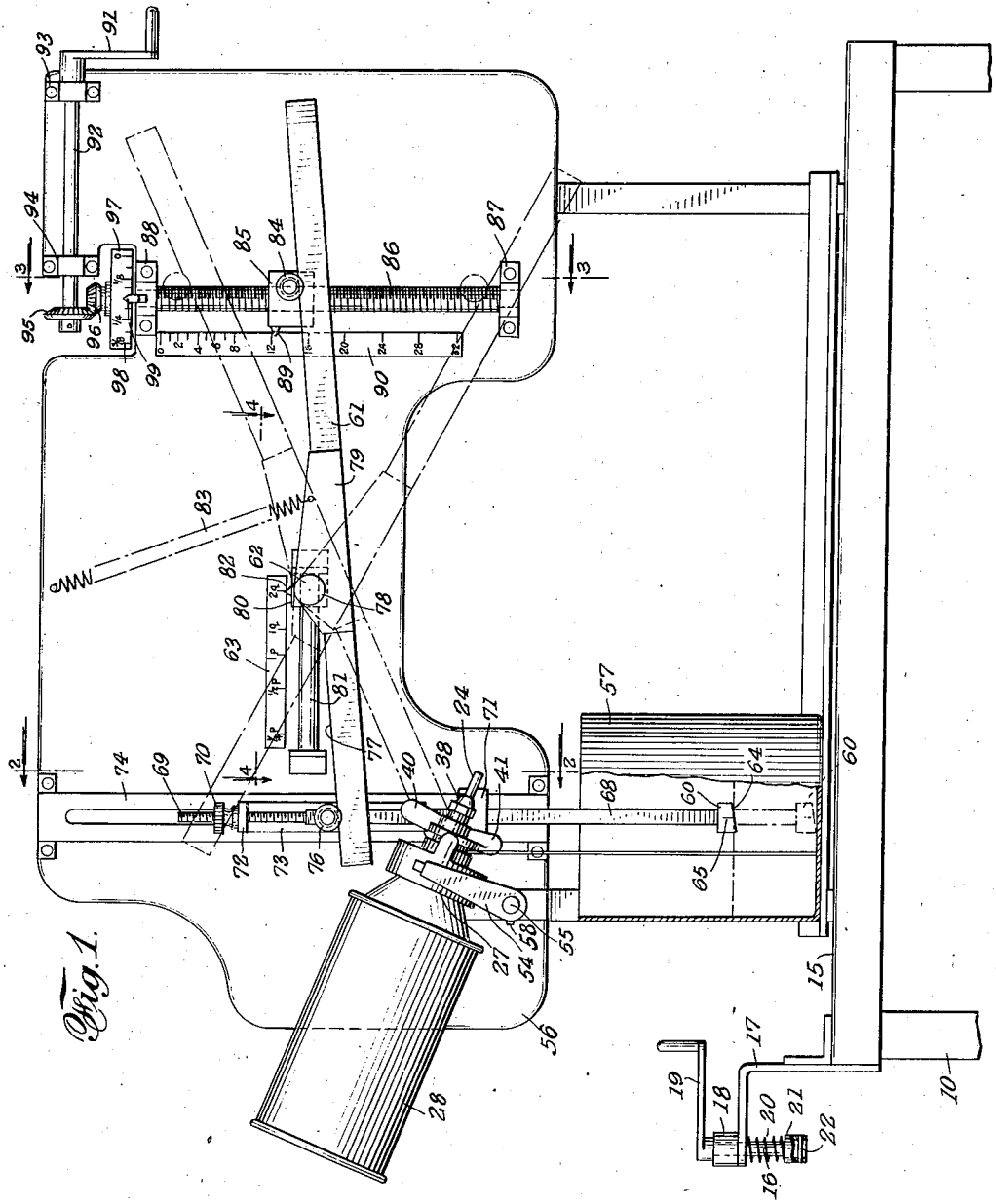

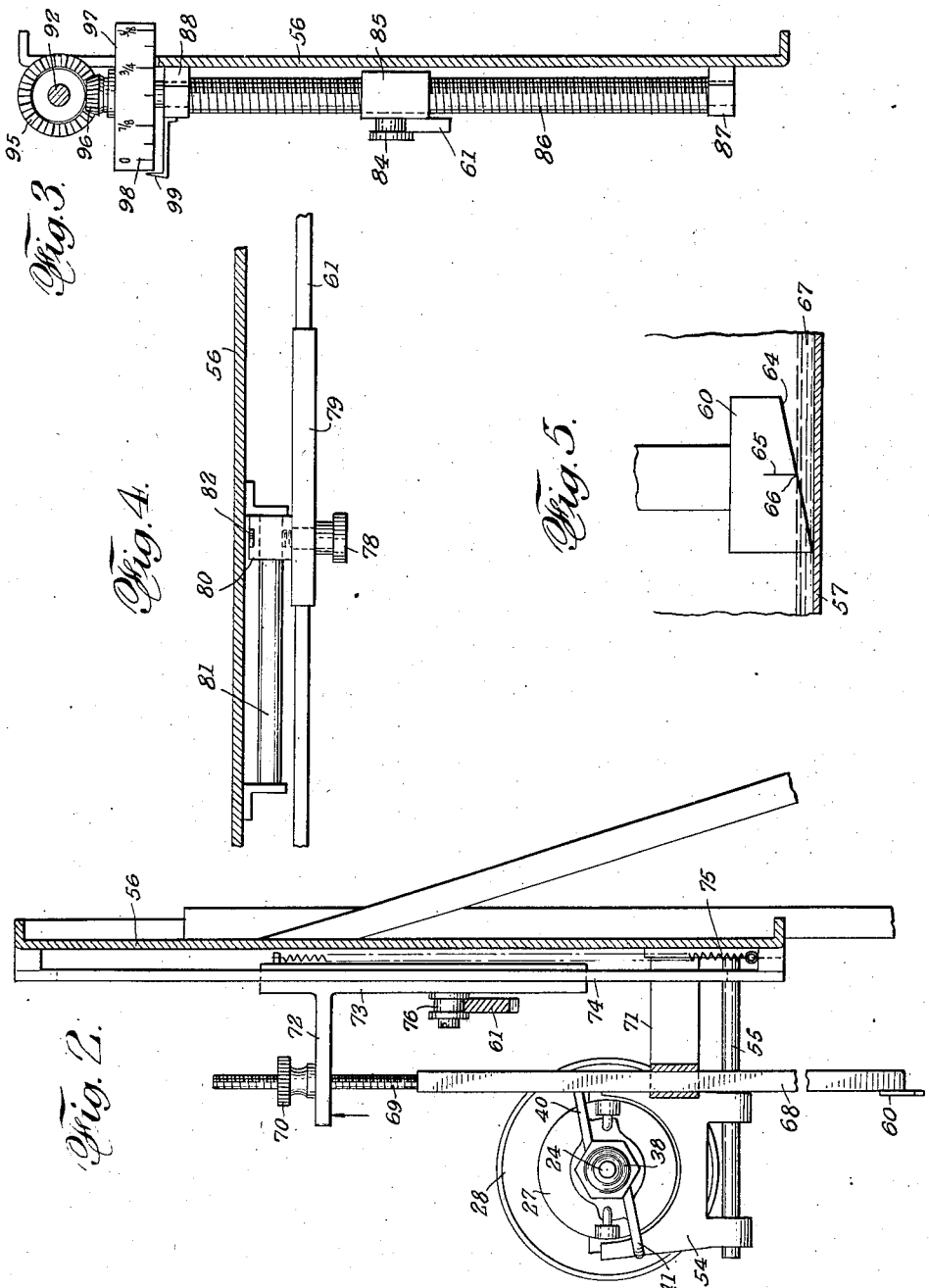

2,354,259

UNITED STATES PATENT OFFICE 2,354,259

MACHINE FOR MEASURING AND PROPORTIONING PAINTS

Nicholas Grubelic, Great Neck, N. Y.

Application April 14, 1941, Serial No. 388,394

18 Claims. (Cl. 33—126.7)

This invention relates to machines for proportioning the quantities of different standard color paints to be mixed in order to obtain a desired total quantity of a mixed paint.

There has long been a demand for simple and inexpensive apparatus capable of eliminating the necessity for calculation on the part of one who desires to follow a paint manufacturer's formula in order to obtain a given quantity, usually small, of a paint to match the color of a painted object, such as an automobile or a part thereof. The manufacturers' formulae for paints of the desired color are usually given in terms of various standard color paints and in quantities sufficient to form a total of one quart. In some cases, the formulae also give the required amounts of the ingredients to form a pint. When it is desired, however, to produce total quantities other than a pint or quart, calculation is necessary since it is obviously impractical on the part of the paint manufacturer to supply tables for all the probable quantities needed on various jobs from the smallest quantity up to one quart or more, because of the many thousands of different matching colors involved.

Apparatus heretofore devised for producing the results above mentioned has been comparatively complicated and consequently so expensive as to have a limited application or if sufficiently cheap, has been inaccurate or incapable of producing the required fractions of the basis unit quantity, which quantity is usually a quart.

My invention therefore contemplates the provision of simple and efficient means capable of easy operation by comparatively unskilled persons, whereby substantially any desired quantity of mixed paint may be obtained by dispensing from each of a number of containers of standard color paint the exact amount of such paint required in accordance with the ratios given by the manufacturer's formula for the unit (quart) quantity, there being indicating means to apprise the operator in ample time when the exact quantity of each standard color paint involved has been dispensed.

My invention further contemplates the provision of a measuring device indicating clearly and with sufficient accuracy for all practical purposes and in sufficient time when the flow of paint is to be cut off to properly proportion each standard color paint in the ratio of the desired total quantity of mixed paint to the unit quantity of the formula.

My invention further contemplates the provision of a proportioning lever adapted to have one end thereof set to the quantity prescribed by the manufacturer's formula and to have the pivot thereof set to the total quantity desired, whereby the other end of the lever controls of setting of an indicating device which determines the level of standard color paint to which a suitably proportioned container is to be filled.

My invention further contemplates the provision of a simple and inexpensive proportioning machine using few parts, but designed to hold and stir the containers for all needed standard color paints prior to the dispensing of paint therefrom, the parts being conveniently arranged to permit rapid selection, stirring and mounting of the containers and easy and rapid setting of the proportioning members.

The various objects of the invention will be clear from the description which follows, and from the drawings, in which, Fig. 1 is a front view of my improved apparatus, only the upper part of the storage cabinet being shown.

Fig. 2 is a vertical section thereof taken on the line 2—2 of Fig. 1.

Fig. 3 is a similar section taken on the line 3—3 of Fig. 1.

Fig. 4 is a horizontal section taken on the line 4—4 of Fig. 1.

Fig. 5 is an enlarged fragmentary elevational view of a portion of the receptacle in which the matching or mixed paint is produced and of the level indicating means used in connection therewith.

Fig. 6 is a front elevation partly in section of a standard color paint container to which the dispensing valve and stirrer has been applied, and of the supporting means for the container.

Fig. 7 is an enlarged side elevation of the same.

Fig. 8 is a fragmentary enlarged bottom plan view of the container valve.

Fig. 9 is a side elevation of my complete apparatus including the measuring and proportioning machine, the stirring means for individual cans or containers of standard color paint and the storage cabinet for the various standard color paints.

Fig. 10 is a vertical section, similar to Fig. 6, of a modified form of the container valve.

Fig. 11 is an end view of the same.

Fig. 12 is a fragmentary sectional view of the same, taken on the line 12—12 of Fig. 11.

In the practical embodiment of the invention which I have shown by way of example, and referring particularly to Fig. 9, the storage cabinet 10 is provided with a series of preferably inclined shelves or racks 11, 12 and 13 designed to hold the various cans or containers 14 of standard color paints. In the operation of the machine, the containers 14 of the required standard color paints may be easily selected in succession from the rack in accordance with the formula for any desired mixed color, the containers being successively arranged in position to dispense standard color paint therefrom into a suitable receptacle.

On the top 15 of the cabinet, is revolubly supported the stirrer shaft 16 as by means of the bracket 17 carrying the bearing 18. The crank 19 is secured to the upper end of the shaft 16 and said shaft is urged normally to its lowermost position by the spring 20 arranged around said shaft and acting against the hollow collar 21 at the lower end of the shaft. A cross pin 22 is carried at the lower end part of the collar and is designed to enter a transverse notch 23 (Fig. 6) at the extreme outer end of the stirrer spindle 24. Suitable blades as 25, 26 are secured to the stirrer spindle and are of such length and width and so spaced apart and in such relative positions that when the screw cap 27 is removed from the container 28, the stirrer blades and spindle may readily be inserted through the discharge opening of the can and into the can with the spindle projecting therefrom.

In the form of the combined valve and paint stirrer shown in Figs. 1, 2, 6, 7, and 8, the open can cap 27 replaces the usual sealing cap of the paint can and supports the dispensing valve for the standard paint container 28, being provided with a central opening 29 rotatably receiving the valve spindle 30. The enlarged head 31 of the valve spindle is provided with a flat face 32 designed to engage the corresponding flat face 33 at the end of the cap 27 to accurately seat thereagainst and thereby normally to cut off the flow of paint. A pair of opposed longitudinal slots 34 and 35 are made in the cylindrical body 30 of the valve spindle, the slot 34 being shorter than the slot 35 and terminating a greater distance from the surface 32 and the slot 35 being always in a lowermost position when paint is to be dispensed from the container. The outer end edge 36 of the slot 35 is preferably inclined (Fig. 8), whereby as the spindle 30 is pulled outwardly and axially away from the cap 27, the outermost corner of the slot 35 is first arranged in the space 37 between the surfaces 33 and 32 to permit a thin trickle of paint to be discharged from the container through the thus exposed outermost corner at the extreme end part of the slot 35. The stream of paint may be increased by increasing the space 37 between the valve surfaces 32 and 33, thereby to expose more of the inclined edge 36 and to increase the resultant effective valve opening.

It will be understood that if the space 37 is increased sufficiently, the outer end of the air inlet 34 becomes exposed beyond the surface 33 to permit air to enter the interior of the can 28 and thereby to accelerate the flow of paint. If a paint container is not opened for some time, evaporation of volatile ingredients within the can or container is frequently sufficient to cause the accumulation therein of gases under pressure. If what is known as "synthetic" paint is used, it is desirable that the accumulated gases be retained within the can and not be replaced with air, because air in the can permits the formation of an undesirable skin or crust on the paint surface. By making the slot 35 on the valve larger than the slot 34, it becomes possible to permit the pressure of the gases within the can to become gradually equalized with the outer air without loss of such gases. After the pressure is equalized, the valve may be opened further to admit air and to discharge a paint stream of the desired size and velocity. The surface 32 prevents the undesirable splashing of paint under the pressure of gases within the can and aids in directing the paint stream vertically downward (Fig. 1).

A valve cap 38 is screwed to the end of the spindle 30 and is shaped to provide the space 39 for packing material, whereby the valve cap cooperates with the spindle to form a stuffing box for the stirrer spindle 24.

Means are provided for insuring that the slot 35 is lowermost when paint is to be dispensed from the can or container. Said means includes the wings 40, 41 extending from the spindle head 31 in opposite directions and providing finger pieces by means of which the spindle may be manipulated. The head 31 of the spindle is extended to form a pair of outwardly bevelled cam surfaces 42, 43 respectively adjacent the wings 40 and 41 and adapted to engage the respective pins 44, 45 to lock the spindle in its closed position (see Fig. 7). Said pins project toward each other from the outstanding respective lugs 46, 47 formed on the cap. It will be understood that as the spindle is rotated by means of the wings 40, 41 to force the bevelled surfaces 42, 43 underneath the pins 44, 45, the spindle is forced towards its sealing position with the surfaces 32 and 33 in pressed contact owing to the shape of the cam surfaces 42, 43.

At the sides of the cap 27 are provided projections 48, 49 each terminating in a downwardly and inwardly inclined edge as 50. Said projections are designed to be inserted into the respective grooves 52, 53 in the can holder 54, the outer edge of each of the grooves being inclined in the same direction as the edge 50 of the projections. Consequently, when said projections are inserted in the grooves, the spindle is in a predetermined position since the position is controlled by the positions of the wings 40, 41 and the positions of the wings are in turn controlled by the cams 42, 43 and pins 44, 45. In order that the valve spindle may be moved outwardly to open the valve, the spindle is first rotated to carry the slot 35 to the lowermost part of the spindle. That is, the spindle must be rotated in the direction of the arrow of Fig. 7 to release the cams 42, 43 from the pins 44, 45, the cams being wide enough to prevent axial movement of the spindle until after the required amount of rotational movement is completed, whereafter the spindle may be pulled outwardly to expose as much of the slot 35 as is required to produce a stream of paint of the desired size. To permit the can to be tilted while held in the holder 54, said holder is adjustably mounted on the fixed rod 55 secured to the frame 56 of the machine. As shown, the pin 58 projecting from the rod 55 enters the slot 59 of the holder 54 and limits the tilting movement of said holder and the can in either direction.

It will be noted that the cap 27, the valve spindle 30 and the parts connected thereto including the stirrer spindle 24 may be handled as a unit and successively applied to and removed from the various paint cans quickly and easily. The usual sealing cap of the can is removed and the entire valve unit and stirrer applied to the standard color paint can be inserting the stirrer blades and spindle within the can and then screwing the cap 27 into place, the spindle being locked in sealing position by the insertion of the cams 42, 43 underneath the pins 44, 45 by rotation of the wings 40, 41. The combined valve and stirrer is of course cleaned after use in one can and before insertion into a can containing a paint of a different color.

The proportioning and measuring device is preferably arranged on the top 15 of the cabinet so that after the paint in a selected can has been stirred by means of the crank 19, the can may be conveniently arranged in the holder 54 and tilted into position ready for the dispensing of the paint therefrom into the receptacle 57.

The machine comprises a paint-level indicator 60, for progressively determining the levels to which the receptacle 57 is to be filled with the various standard color paints included in the manufacturer's formula, and of means for determining the setting of the indicator in accordance with the total quantity of paint desired to be mixed in the receptacle 57. A control lever 61 is therefore provided for progressively raising the indicator 60 the required amount to determine the actual volume of each standard color paint required to be dispensed from the standard color cans 28 successively.

As viewed in Fig. 1, the right hand end of said lever is raised or lowered about its preferably horizontal pivot 62 to indicate the amount of standard color paint in the unit quantity (quart or 32 ounces) as given by the formula. The pivot 62 is also adjusted preferably horizontally to indicate the total quantity of the mixed or matching color paint desired and with which the receptacle 57 is to be filled. On the adjustment of the right end of the lever 61, the left end is automatically raised and raises the indicator 60 the required distance to determine the volume of paint to be added to the receptacle 57 and the required upper level to which standard color paint is to be supplied to the receptacle.

Preferably, therefore, a series of receptacles 57 are provided to selectively cooperate with the different markings of the scale 63 indicating desired total quantities. For example, a receptacle of comparatively small diameter is used in proportioning total quantities from one quarter of a pint, (four ounces), to a half pint. A receptacle of somewhat larger diameter is used for quantities from a half pint to one pint, a third larger receptacle for quantities from one pint to one quart and the largest receptacle from quantities of one quart to two quarts. The heights of the different receptacles 57 may remain constant, but the cross-sectional areas thereof vary. I have found that four receptacles are sufficient to cover all total quantities desired within practical limits.

The paint-level indicator 60 is made in the form of a plate or sheet having an inclined lowermost edge 64 (see Figs. 2 and 5), and having an indicating mark 65 thereon meeting said lowermost edge at about the middle point 66 of the edge. If the position of the indicator is temporarily fixed, liquid may be poured into the receptacle until the level thereof is at the point 66, thereby indicating that addition of liquid must be stopped. At this time, the lower half of the edge 64 is covered. The gradual submersion of said half of the edge 64 gives the operator ample time to cut off the supply stream. At the start of the mixing operation, a small quantity of liquid thinner 67 may be poured into the receptacle sufficient to cover the bottom thereof to a depth slightly greater than the height of the edge 64. Then the indicator may be lowered into the liquid until the liquid reaches the mark 66, as shown in Fig. 5. The operation of proportioning standard color paint in accordance with the formula may then proceed.

The indicator 60 is mounted on the rod 68 terminating at its upper end in the threaded portion 69 on which is mounted the adjusting nut 70. Said rod is supported for vertical reciprocation in the bracket 71 (Fig. 2) projecting from the frame 56 of the machine, while the portion 69 thereof passes through the arm 72 projecting from the slide 73. Said slide is mounted on the fixed guide 74 secured to the machine frame and is normally pulled by the spring 75 downwardly to cause the roller 76 carried thereby to engage the upper edge 77 of the lever 61. By means of the nut 70, the indicator 60 may be manually raised from or lowered into its initial position shown in Fig. 5 preparatory to commencing the proportioning of paint. In order that the indicator may be easily inserted into the receptacle, the threaded portion 69 passes loosely through the arm 72, whereby the entire rod may readily be lifted relatively to the arm and to the slide 73 to permit the receptacle 57 to be arranged in position on the cabinet top 15, whereafter the rod is released to insert the indicator into the receptacle.

As shown in Fig. 4, the pivot for the lever 61 consists of the set screw 78 passing through the projection 79 on the upper edge of the lever and screwed into the slide 80 slidably mounted on the fixed guide 81. The slide 80 also carries the pointer 82 in alignment with the axis of the set screw 78 and operating in connection with the total quantity scale 63. By tightening the set screw, the pivot is secured against any movement though the lever may rotate about the pivot. By loosening the set screw, the slide and consequently the pivot for the lever may be so arranged as to cause the indicator 60 to indicate such progressive quantities of standard color paint as will finally produce the total quantity desired as indicated by the scale 63. In other words, the pointer 82 is set on the scale 63 for the desired total quantity whether it be four ounces or two quarts or any intermediate amount, the movement of the pivot adjusting the distance between the roller 76 and the pivot of the lever 61 and thereby controlling the length of the left arm of the lever and correspondingly increasing the length of the right arm of the lever to the right of the pivot. Said right arm of the lever is pulled by the spring 83 up against the roller 84 carried by the slide 85. Said slide is internally threaded and is mounted and moves upon the screw 86 which is fixedly mounted at its ends in the bearings 87, 88. The pointer 89 on the slide 85 cooperates with the scale 90 to indicate the quantity of the standard color paint given by the manufacturer's formula. Rotation of the screw 86 and consequent movement of the slide 85 is effected by rotating the handle 91. Said handle is mounted at one end of the shaft 92 carried by the bearings 93, 94 and also carrying the bevel gear 95 at its other end. The gear 95 meshes with the bevel gear 96 at the upper end of the screw 86.

To enable the crank to set the pointer 89 accurately on the scale 90, a micrometer wheel 97 is fixed to the upper end part of the screw 86 and carries a scale 98 cooperating with the fixed pointer 99 on the bearing 88, to indicate fractions of a division on the main scale. For example, the main scale 90 may be graduated to indicate ounces in the manufacturer's formula and the micrometer scale 98 may accordingly be graduated to indicate $\tfrac{1}{16}$ ounces.

It will therefore be noted that while one end of the lever 61 is set to indicate quantities of standard color paint ingredients in accordance with the manufacturer's formula, the other end of the lever sets the indicator 60 above the bottom of the receptacle 57 a corresponding amount to indicate the level up to which standard color paint is to be inserted into the receptacle in accordance with the setting of the pivot 62 on the scale 63 for the total quantity of mixed paint to be compounded and thereby to proportion the amount of standard color paint to be dispensed from the various containers 28 in the required ratio and without any calculation.

The manufacturer's formula may give the quantities for a certain grey color to be as follows:

|  | Amounts of each color | Scale setting |
|---|---|---|
|  | Ounces |  |
| White | 12¾₆ | 12¾₆ |
| Black | 10½ | 22¹¹⁄₁₆ |
| Yellow | 4¾ | 27⁷⁄₁₆ |
| Blue | 4⁹⁄₁₆ | 32 |

Suppose now it is required to make two quarts of the desired grey, first, the proper receptacle 57, in this case the largest size, is arranged on the table 15 by lifting the nut 70 against the action of the spring 75, thereby raising the indicator 60 to a sufficient extent to permit the receptacle 57 to be arranged thereunder. The nut 70 is then released permitting the indicator 60 to drop into the receptacle. The pivot 62 is now set by moving the pointer 82 to indicate two quarts on the scale 63 and the screw 78 is tightened. The crank 91 is then manipulated to set the pointer 89 at zero on the scale 90 and to set the pointer 99 to zero on the micrometer scale 98. Finally, the nut 70 is adjusted to carry the indicator 60 close to or in contact with the bottom of the receptacle 57 and sufficient thinner is poured into the receptacle to the mark 66, and the indicator again adjusted if necessary.

The machine has now been conditioned ready for operation. To operate the machine, the can 28 of white is selected from its rack, its cap is removed and replaced by the cap 27 and the combined valve and stirrer carried thereby, while at the same time, the stirrer blades 25, 26 are inserted into the can. The wings 40, 41 are rotated in a clockwise direction, as seen in Fig. 7, if necessary to close the valve, and the can is arranged in the vertical position on the upper cabinet shelf to cause the pin 22 of the stirring mechanism to enter the slot 23. This is done by lifting the crank 19 and then permitting the pin 22 to drop into the slot 23. Rotation of the crank 19 with one hand while the can is held by the other for a few turns stirs the paint and conditions it to be dispensed. The crank 19 is now lifted to release the can, and the can is placed in its holder 54 by entering the inclined projections 48, 49 thereof in the grooves 52, 53. The can cannot be placed upside-down in the holder because of the inclined edges of the projections and grooves, but must necessarily be placed therein so that when the valve is opened, the slot 35 will be at the bottom. The handle 91 is now rotated to rotate the lead screw and thereby to arrange the pointer 89 to the point 12 on the scale 90. Rotation of the handle is now continued slowly until the pointer 99 indicates $\tfrac{3}{16}$ ounces (Fig. 1). The scale having been set, the valve spindle may now be pulled away from its seat 33, a small amount sufficient to expose part only of the inclined end 36 of the slot 35. The pressure of gases within the can causes the paint to flow out of the comparatively small opening comparatively readily even if no air enters the can through the air inlet 34. This continues until the gas pressure within the can is equalized with atmospheric pressure while no air is admitted. When the operator sees that the velocity of the paint stream is decreasing, the valve spindle may be pulled out a little further to increase the size of the discharge opening, and ultimately when the pressure is completely equalized, to expose part of the air inlet slot 34 for the entrance of air. By this arrangement of slots, it will be noted that the volatile ingredients are not replaced with air, but are retained within the can to be mixed with the additional amount of air necessary to permit easy flow of the paint therefrom at the required time.

When the pressure is so equalized, the valve spindle may be pulled out to a larger extent since a fairly large amount of white is required. It will be understood that by setting the pointer 89 on the scale 90, the lever 61 is rotated about its pivot and the left end thereof raises the roller 76, the rod 68 and the indicator 60 to the required height to indicate the level which the white paint must reach in the receptacle 57 in order that the quantity thereof be properly proportioned to the manufacturer's formula. As the paint dispensed from the can 28 approaches the indicator 60, the size of the paint stream may be reduced by pushing inwardly on the valve spindle and thereby reducing the size of the stream to the merest trickle if desired. The operator watches the paint level and as it reaches the lower corner of the indicator 60, prepares himself to cut off the stream either by means of an interceptor or by closing the valve just before the paint level reaches the mark 66. Because of the inclination of the edge 64, the operator sees the gradual covering of the lower part of said edge and is prepared and has sufficient time to close the valve at the required moment to obtain the exact desired level of paint in the receptacle.

The next color to be dispensed is black. The operator removes the white can and replaces with the black can with a different stirrer and valve, or washing off the one previously used for the white can. He stirs the contents of the black can and arranges it in place in the holder 54 and operates the handle 91 to the next scale setting, namely, 22¹¹⁄₁₆. This figure is obtained by adding the amount of black required, namely, 10½ ounces to the amount of white already dispensed, namely, 12¾₆ ounces. However, the operator need perform no addition since the formula shows the added quantity in the column scale setting. The pointers 89 and 99 are therefore set to 22¹¹⁄₁₆ on the scales 90 and 98. Before proceeding to dispense the paint from the black can, the rod 68 is lifted and the bottom of the indicator wiped off to clean it of white paint. The rod it then released to its proper position within the receptacle as determined by the position of the left end of the lever 61. The operator proceeds as before to dispense the black paint until it reaches the mark 66 of the paint-level indicator.

The same operation is repeated with the can of yellow, the pointers 89 and 99 being set to indicate 27%6 and thereby dispensing an amount of yellow paint proportioned to the total desired quantity and to the manufacturer's formula of 4¾ ounces.

Finally, the operation is repeated with the blue can, the setting of the scale 90 now being exactly 32 ounces or a full quart, but the total amount dispensed into the receptacle 57 being two quarts in accordance with the setting of the pivot 62 on the scale 63.

Referring to Figs. 10–12, I have there shown a combined stirrer and valve wherein the valve part is somewhat easier to operate than the valve hereinbefore described, though the advantages are retained. In this form of valve, the valve-carrying can cap 27a is provided with an arcuate air inlet opening 34a and with a longer opposed paint discharge opening 35a having an inclined or non-radial end edge 36a. The stirrer shaft 24a passes through the central threaded extension of the cap as well as through the nut 38a which is screwed on to the threaded extension to form the stuffing box 39a. A spring 100 around the extension presses the rotary valve cover 101 against the cap, normally to maintain the valve openings closed. The cover 101 is rotated by the handle 102 projecting therefrom first to expose a part of the inclined edge 36a and to permit the discharge of a thin trickle of paint, and then to expose the air inlet and enough of the discharge opening to dispense the desired amount of paint without waste of time.

A bevelled extension 103 on the cover directs the paint stream downwardly and guards against splashing against the walls of the receptacles under excessive gas pressure within the can. Such splashed paint when it flows into the rest of the paint in the receptacle might not affect the indicator in time to be measured and might cause a variation in measurement and color.

It will be seen that the apparatus above described is comparatively simple and inexpensive, but efficient and sufficiently accurate for practical mixing of quantities of paint from four ounces to two quarts and requires little skill on the part of the operator and no calculation on his part.

It will further be seen that I have provided a machine well adapted to meet the severe requirements of practical use.

While I have shown and described a certain specific embodiment of my invention, it will be understood that a number of changes may be made in the operating parts thereof or the connections therefor without departing from the spirit and scope of my invention as set forth in the appended claims.

I claim:

1. In a machine for proportioning the standard color paint ingredients of a desired mixed paint, a receptacle for the mixed paint, an indicator insertable into and removable from the receptacle, and means for moving the indicator vertically to determine the required level of each of the standard color paint ingredients to be supplied to the receptacle, said means comprising a lever, a pivot for the lever and adjustable therealong to indicate the total desired quantity of paints to be supplied to the receptacle, means operatively connecting the indicator to one end of the lever, and means for adjusting the other end of the lever to positions in accordance with a formula for the mixed paint based on a different total quantity than the desired total quantity.

2. In a machine of the character described, a frame, a vertically movable paint-level indicator slidably mounted on the frame, a lever having an operative connection with the indicator, a pivot for the lever movable along the lever, a substantially horizontal guide on the frame for the pivot, a total quantity scale indicating the position of the pivot, a screw revolubly mounted on the frame, a member slidably mounted on the screw and having an operative connection with the lever, a scale for the member, a micrometer scale on the screw, and means for rotating the screw to set the member and thereby to set the lever and the indicator.

3. In a machine for proportioning the standard color paint ingredients of a desired mixed paint, a vertically movable indicator, a lever controlling the height of the indicator, a pivot for the lever and adjustable therealong, the indicator being arranged on one side of the pivot, and means for progressively moving that part of the lever on the other side of the pivot for selected distances and thereby raising the indicator different but correspondingly proportionate distances.

4. In a machine for proportioning the standard color paint ingredients of a desired mixed paint, a paint-level indicator, and proportioning means for setting the indicator, said means comprising a pivoted member having an operative connection with the indicator, a pivot for the member and adjustable therealong, a total mixed paint quantity scale indicating the position of the pivot, and a standard color scale spaced from the indicator and the pivot and adjacent the member to determine the setting of the member in accordance with a formula for a quantity of mixed paint other than said total quantity.

5. In a machine for proportioning in succession paints of standard colors to make a total quantity of mixed paint in accordance with a formula for a different total quantity of such mixed paint, a paint-level indicator, and means for setting the indicator in advance of delivery of paint from a standard color container and to indicate the level to which standard color paint is to be supplied to a receptacle, said means comprising a scale for the desired total quantity of mixed paint, a second scale for the quantity of standard color paint in the formula, a member having an operative connection with the indicator and extending between the scales, a pointer having an operative connection with the member and movable along the total quantity scale on substantially longitudinal movement of the member, and a second pointer movable along the second scale on substantially transverse movement of said member, said pointers indicating proper selected positions of different points of said member and thereby to control the position of the indicator.

6. In a machine of the character described, a lever, a pivot for the lever, means for moving the pivot in a predetermined direction substantially longitudinally of the lever, a first indicating means for indicating the position of the pivot, a second indicating means non-parallel to the first indicating means for indicating the position of one end of the lever, and a paint-level indicator at the other end of the lever.

7. In a machine of the character described, a lever, a pivot for the lever adjustable therealong, means for indicating the position of the pivot, means for indicating the position of that part of the lever on one side of the pivot, a paint-level indicator on the other side of the pivot and having an operative connection with the lever and guide means for the indicator constraining the indicator to move in a vertical path.

8. In a machine of the character described, a paint-level indicator, means constraining the indicator to move in a vertical path, a lever having a pivot adjustable along the lever, a total-quantity scale indicating the position of the pivot, an operative connection between the lever and the indicator, and a second scale indicating the position of a part of the lever spaced from the indicator and the pivot whereby movement of said lever part through selected distances along said second scale causes movement of the indicator through proportionate vertical distances, the ratios of said selected distances to the vertical distances being fixed for any given position of the pivot of the total-quantity scale.

9. In a machine of the character described, a vertically movable paint-level indicator, means for adjusting the indicator to indicate a selected initial level, a total quantity scale, a standard color paint scale based on different total quantities than those indicated by the total-quantity scale, a member having an operative connection with the indicator and extending between the scales, and means for setting spaced points of the member respectively at selected points of said scales and thereby to determine the effective height of the indicator.

10. In a machine of the character described, a paint-level indicator having an inclined lower edge adapted to have the lowermost part thereof in contact with the uppermost part of the paint in a receptacle to indicate the level of said paint, and means including a pair of scales for setting the indicator in accordance with the ratio of the quantity of standard color paint desired to the amount of standard color paint in a formula, one of the scales being arranged to extend in one direction, the other of the scales extending in a different direction, said means further including an elongated member between the scales, an operative connection between the elongated member and the indicator, and means for fixing different selected points of the member at selected points of the respective scales.

11. In a machine of the character described, a vertically movable paint-level indicator, means for moving said indicator upwardly a distance dependent on the amount of standard color paint in a formula and the total quantity of a mixed paint desired of which the standard color paint is an ingredient, said indicator moving means including a member extending between the scales hereinafter mentioned and having an operative connection with the indicator, said indicator moving means also including mechanism to set the member with respect to selected points of said scales respectively, and means for indicating the amount of movement of the indicator-moving means including a pair of fixed scales, one of said scales indicating total quantities desired in volume units and fractions thereof and the other indicating the quantity of standard color paint in said formula in fractions of one of said volume units.

12. In a machine of the character described, a vertically movable paint-level indicator terminating at its lower end in an inclined edge adapted to have part thereof dip into the paint in a receptacle, spring-pulled means movably supporting the indicator to permit the indicator to be raised out of the receptacle and lowered thereinto, means having an operative connection to the indicator for adjusting the effective height of the indicator with respect to a selected initial level, and means for further adjusting the indicator upwardly to a position to indicate the level of paint to be inserted into the receptacle, said means including a lever having a pivot adjustable along the lever, an operative connection between the lever and the indicator, and indicating means for indicating the position of the pivot and the setting of the lever.

13. In a machine of the character described, a lever, a pivot carried by the lever and comprising a set screw, a slide carrying the set screw and adapted to be clamped in position, a guide for the slide, a scale adjacent the slide determining the position of the pivot, a screw revolubly mounted with its axis at substantially right angles to the axis of the guide, a second slide movable on the screw on the rotation of the screw, a second scale for the second slide, a paint-level indicator at a point on the lever remote from the screw, a roller on the indicator, a second roller on the second slide, both of said rollers being arranged to engage the upper edge of the lever, said lever being spring-pulled against the second roller, and a spring urging the indicator roller against the upper edge of the lever.

14. In a machine of the character described, a lever, a pivot for the lever including a slide secured to the lever and movable therewith, a total quantity scale for the slide, a lead screw adjacent one end of the lever, a second slide mounted for movement on the screw on the rotation of the screw, a standard color paint scale adjacent the second slide, a paint-level indicator adjacent the other end of the lever, an operative connection between the indicator and the lever, and an operative connection between the second slide and the lever.

15. In a machine for proportioning in succession paints of standard colors to make a total quantity of mixed paint in accordance with the formula for a different total quantity of such mixed paint, a receptacle for the mixed paint, means for indicating the relative amount of standard color paint to be dispensed from a selected container into the receptacle including a vertically movable paint-level indicator, a first scale to indicate the amount of standard color paint in the formula and a second scale to indicate fractions and different units of the total quantity of paint desired, and means for vertically and progressively moving the indicator a distance bearing the same ratio to the amount of standard color paint in the formula as the total quantity of mixed paint desired bears to said different total quantity of mixed paint of the formula, said last mentioned means including an element having an operative connection with the indicator, means for fixing one point of the element at a selected point of the second scale corresponding to the total quantity of mixed paint desired, and means for positioning a different point of the element progressively at selected points of the first scale.

16. In a machine of the character described, means for supporting a container for a paint of a standard color, a frame associated with said supporting means, a vertically adjustable paint-level indicator slidably mounted on the frame for vertical movement relatively thereto, a total-quantity scale on the frame spaced from the indicator and indicating units and fractions thereof, a standard color scale on the frame spaced from the indicator and from the total-quantity scale, an indicator-control member extending between the scales and having an operative connection with the indicator to set the indicator, means for fixing a point of said member relatively to a selected point of the total-quantity scale and means for moving a different point of said member progressively along the standard color scale thereby to progressively raise the indicator distances proportionate to the distances which said different point of the member is moved along the standard color scale.

17. In a machine of the character described, a receptacle, a paint-level indicator, means for supporting the receptacle and for slidably supporting the indicator for vertical movement into and out of the receptacle, means carried by the supporting means for adjusting the height of the indicator with respect to the receptacle including an element having an operative connection with the indicator, a total-quantity scale for determining the position of a selected point of the element, a standard color scale for determining the position of a different point of the element and means carried by the support and having an operative connection with the element for moving said different point.

18. In a machine of the character described, a paint-level indicator adapted to contact with the upper part of the paint in a receptacle to indicate the level of said paint, and means for setting the indicator in advance of the insertion of paint into the receptacle to indicate the required level of said paint and thereby to indicate that volume of paint to be inserted into the receptacle bearing the same ratio to the total quantity of paint desired as the amount of standard color paint given in a formula bears to the total quantity of mixed paint given by said formula, said means including a lever, an operative connection between one end of the lever and the indicator, means for moving the other end of the lever, and indicating means indicating the position of said other end of the lever and thereby indicating the setting of the indicator.

NICHOLAS GRUBELIC.